(12) United States Patent
Iida

(10) Patent No.: US 10,457,435 B2
(45) Date of Patent: Oct. 29, 2019

(54) FOOD CONTAINER SUPPLY DEVICE

(71) Applicant: Sodick Co., Ltd., Kanagawa (JP)

(72) Inventor: Hisao Iida, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 106 days.

(21) Appl. No.: 15/713,710

(22) Filed: Sep. 25, 2017

(65) Prior Publication Data
US 2018/0134430 A1   May 17, 2018

(30) Foreign Application Priority Data

Nov. 17, 2016  (JP) .................................. 2016-224137

(51) Int. Cl.
| | | |
|---|---|---|
| *B65G 59/10* | (2006.01) | |
| *B65H 3/00* | (2006.01) | |
| *B65B 43/46* | (2006.01) | |
| *B65G 59/06* | (2006.01) | |

(52) U.S. Cl.
CPC .............. *B65B 43/46* (2013.01); *B65G 59/06* (2013.01); *B65G 59/105* (2013.01); *B65G 59/106* (2013.01); *B65G 2201/0235* (2013.01)

(58) Field of Classification Search
CPC .... B65G 59/062; B65G 59/00; B65G 59/105; B65G 59/106; B65G 59/06; B65G 59/101; B65H 2301/423225; B65H 3/30; B65H 3/32; B65B 43/44; B65D 1/34
USPC .............. 221/223, 251, 297, 298; 414/795.4, 414/795.6, 797.6, 797.8, 798; 451/333
See application file for complete search history.

(56) References Cited

U.S. PATENT DOCUMENTS

| | | | | |
|---|---|---|---|---|
| 3,705,657 A | * | 12/1972 | Arnemann | B65G 57/302 414/801 |
| 4,630,812 A | * | 12/1986 | Yano | B65H 3/122 271/132 |
| 4,909,412 A | * | 3/1990 | Cerf | B65G 59/105 221/1 |

(Continued)

FOREIGN PATENT DOCUMENTS

| | | |
|---|---|---|
| JP | 2010001040 | 1/2010 |
| JP | 2016069076 | 5/2016 |
| JP | 5982053 | 8/2016 |

OTHER PUBLICATIONS

"Office Action of Japan Counterpart Application," dated Apr. 6, 2017,with English translation thereof, p. 1-p. 6.

*Primary Examiner* — Gregory W Adams
(74) *Attorney, Agent, or Firm* — JCIPRNET

(57) ABSTRACT

Provided is a food container supply device in which a gripping device includes a pair of claws and a pair of shutters which move in each horizontal direction between a forward movement position of contacting a food container and a backward movement position of non-contacting the food container respectively and a control device selects one of gripping operation patterns including an operation of respectively moving the claw and the shutter to the forward movement position at the same time, an operation of moving one of the claw and the shutter to the forward movement position and then moving the other to the forward movement position, and an operation of moving only one of the claw and the shutter to the forward movement position during each operation of extracting the food container in response to a shape of the food container.

5 Claims, 16 Drawing Sheets

(56) References Cited

U.S. PATENT DOCUMENTS

| | | | | |
|---|---|---|---|---|
| 4,991,741 A | * | 2/1991 | Anderson | B65G 59/106 221/223 |
| 5,067,308 A | * | 11/1991 | Ward | B65B 43/44 221/223 |
| 5,607,282 A | * | 3/1997 | Brannen | B65G 59/00 198/463.1 |
| 5,975,839 A | * | 11/1999 | Ashby | B65G 59/062 221/223 |
| 6,024,532 A | * | 2/2000 | Ashby | B65G 59/062 414/797.8 |
| 6,417,484 B1 | * | 7/2002 | Canella | B23K 26/0838 219/121.68 |
| 6,558,110 B2 | * | 5/2003 | Lu | H01L 21/68707 221/297 |
| 7,641,438 B2 | * | 1/2010 | Jaspers | B65G 47/91 221/211 |
| 8,602,715 B2 | * | 12/2013 | Schoeppe | B01L 9/523 221/11 |
| 9,017,008 B2 | * | 4/2015 | Beressey | B65G 59/105 414/796.9 |
| 2002/0176803 A1 | * | 11/2002 | Hamel | G01N 35/028 422/511 |

\* cited by examiner

FOOD CONTAINER SUPPLY DEVICE

CROSS-REFERENCE TO RELATED APPLICATION

This application claims the priority benefit of Japan application serial no. 2016-224137, which was filed on Nov. 17, 2016. The entirety of the above-mentioned patent application is hereby incorporated by reference herein and made a part of this specification.

BACKGROUND OF THE INVENTION

Field of the Invention

The present invention relates to a food container supply device which automatically supplies a food container to a predetermined carrying place.

Description of Related Art

Processed foods such as cooked noodles, side dishes, and lunch boxes are packaged in prepared food containers by a machine or a person and are sold by using the food containers as exteriors. As the material of the food containers, for example, polystyrene type resin, polypropylene type resin, paper, glass, iron type metal, and light metal are known. In the invention, the contents contained in the food containers include products which are already packaged, for example, small bags enclosing ingredients of cup noodles.

As a food container supply device which automatically and continuously supplies a food container, as disclosed in Patent Document 1 (Japanese Patent No. 5982053), generally a food container positioned right above the lowest food container among stacked food containers is gripped by a pair of gripping members and the lowest food container is extracted by sucking. The gripping members include fingers which are replaceable in accordance with the type of the food container.

PRIOR ART DOCUMENT

Patent Documents

[Patent Document 1] Japanese Patent No. 5982053

SUMMARY OF THE INVENTION

The food containers may have various shapes including a curved shape, a shape having a small gap into which the gripping member is inserted, and the like. For that reason, there has been a demand for a food container supply device capable of appropriately supplying various food containers. Further, it is desirable to replace parts according to the shape of the container less frequently in order to shorten the setup time.

The invention has been made in view of such circumstances and an object of the invention is to supply more kinds of food containers by switching a gripping operation pattern of a gripping device in response to a shape of the food container.

According to the invention, provided is a food container supply device including: a stocker which accommodates a food container group in a stacked state; a stocker holder which holds the stocker; an extraction conveyor which moves in a reciprocating manner in a perpendicular direction between an extraction position of extracting a lowest food container in the food container group and a feeding position of feeding the lowest food container, and includes a suction port of sucking the lowest food container; a gripping device which is disposed between the stocker holder and the extraction conveyor, moves up and down to control a positioning, and presses at least a second food container from the lowest food container in the food container group; and a control device which controls positioning of at least the gripping device, wherein the gripping device includes a pair of claws which move in a first horizontal direction between a first forward movement position of contacting the food container and a first backward movement position of non-contacting the food container, and a pair of shutters which moves in a second horizontal direction orthogonal to the first horizontal direction between a second forward movement position of contacting the food container and a second backward movement position of non-contacting the food container, and wherein the control device selects one of gripping operation patterns including an operation of respectively moving the claw to the first forward movement position and moving the shutter to the second forward movement position at the same time, an operation of moving one of the claw and the shutter to the first forward movement position or the second forward movement position and then moving the other to the first forward movement position or the second forward movement position, and an operation of moving only one of the claw and the shutter to the first forward movement position or the second forward movement position, during each operation of extracting the food container in response to a shape of the food container.

In the food container supply device according to the invention, it is possible to switch one of gripping operation patterns including an operation of respectively moving the claw to the first forward movement position and the shutter to the second forward movement position at the same time, an operation of moving one of the claw and the shutter to the first forward movement position or the second forward position and then moving the other to the first forward movement position or the second forward movement position, and an operation of moving only one of the claw and the shutter to the first forward movement position or the second forward movement position, in response to the shape of the food container. For that reason, it is possible to supply more kinds of food containers generally by extracting the food containers one by one.

DESCRIPTION OF THE EMBODIMENTS

Figure 1:
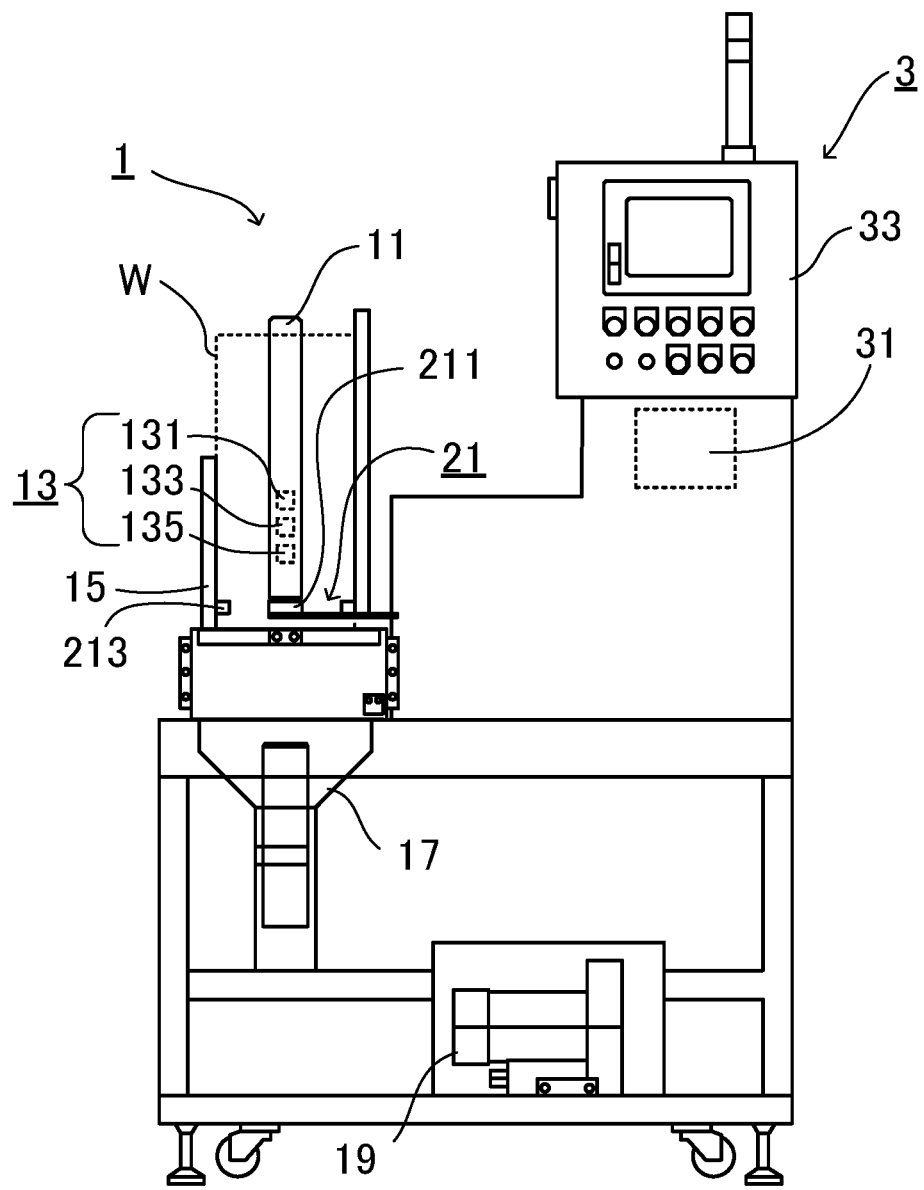
FIG. 1 is a side view showing an entire overview of a food container supply device of the invention.

As shown in FIG. 1, a food container supply device of the embodiment mainly includes an extraction unit 1 and a control unit 3. The extraction unit 1 includes a stocker holder 11, a pusher 13, a side guide 15, an extraction conveyor 17, a ring blower 19, and a gripping device 21. The control unit 3 includes a control device 31 and an operation panel 33.

A stocker W of the food container supply device of the embodiment is a rectangular parallelepiped container-type outer container that accommodates a food container group. At least a part of a lower surface of a box-shaped casing of the stocker W is opened and a plurality of food containers are, for example, suspended to be accommodated in advance while being stacked in the vertical direction. The food container group which is contained in the stocker W may be connected to an integrally molded connection part such as a runner so that the food containers do not fall apart.

In the food container supply device of the embodiment, an operator manually supplies the stocker W to the stocker holder 11 of the extraction unit 1, but the food container supply device may be configured to automatically supply the stocker W by using, for example, a conveyor or the like.

The extraction unit 1 is a food container extraction device which automatically feeds the food containers one by one from the food container group accommodated in the stocker W.

The stocker holder 11 of the extraction unit 1 holds the supplied stocker W. The food container supply device of the embodiment accommodates the food containers, which are stacked in the vertical direction while the food containers are partially connected to one another, in the parallelepiped stocker W. The food container may have a size to be accommodated in the stocker W which can be held while being sandwiched by the stocker holder 11 and can be supplied basically regardless of a difference in type such as a size, a shape, and a material. For that reason, there is merit that more kinds of food containers can be supplied.

One or more pairs of pushers 13 which grip the food container accommodated in the stocker W are provided at a predetermined interval in the stocker holder 11. The pusher 13 reduces a load applied to the food container in the lower part of the stocker W and prevents a separation error of the food container caused by the distortion due to the load or the like. In the food container supply device of the embodiment, the food container is sequentially fed downward while three pairs of pushers 131, 133, and 135 are respectively opened and closed. Specifically, first only the lower pusher 135 is opened and the upper pusher 131 and the intermediate pusher 133 are allowed to grip the food container. Next, only the intermediate pusher 133 is opened and the upper pusher 131 and the lower pusher 135 is allowed to grip the food container. Then, only the upper pusher 131 is opened and the intermediate pusher 133 and the lower pusher 135 is allowed to grip the food container. When the above-described operations are repeated, several food containers are fed downward.

The side guide 15 is provided between the stocker holder 11 and the extraction conveyor 17, and guides the stocker W in a positioned state. The side guide 15 includes a pair of guide plates which are disposed to face each other and at least one guide plate is moved in a reciprocating manner to be positioned by the control device 31 in a direction parallel to a second horizontal direction (a Y-axis direction). The side guide 15 of the food container supply device of the embodiment includes a driving device which is a servo motor controlled by the control device 31. For that reason, the food container supply device of the embodiment has a merit of reducing a burden on the operator in a setup work before the supply operation. In addition, as will be described later, in the food container supply device of the embodiment, the food container is gripped by a pair of claws 211 provided in the stocker holder 11 and a pair of shutters 213 provided in the side guide 15. For that reason, the stocker holder 11 and the side guide 15 may be used to guide the food container group to a certain extent and do not need to be replaced every time in response to the shape of the food container.

Figure 2:
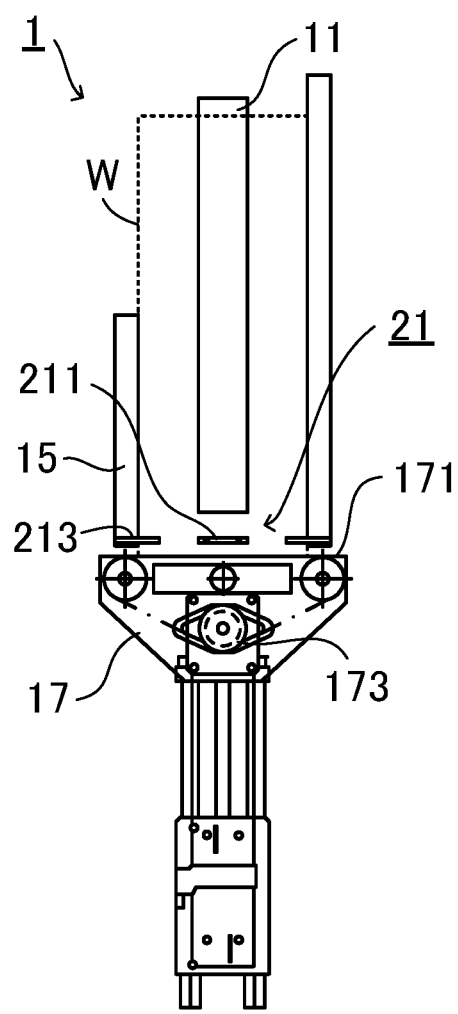
FIG. 2 is a side view showing a configuration of an extraction unit 1.
Figure 3A:
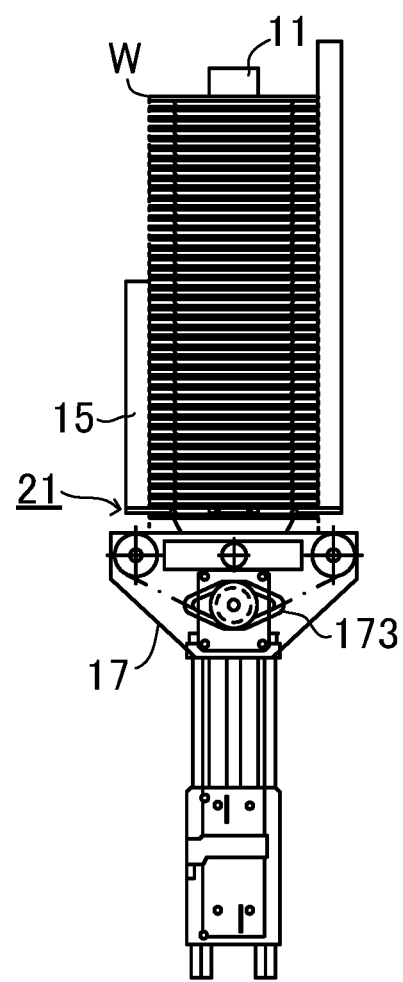
FIG. 3A is an explanatory diagram showing an extraction conveyor 17 at an extraction position.
Figure 3B:
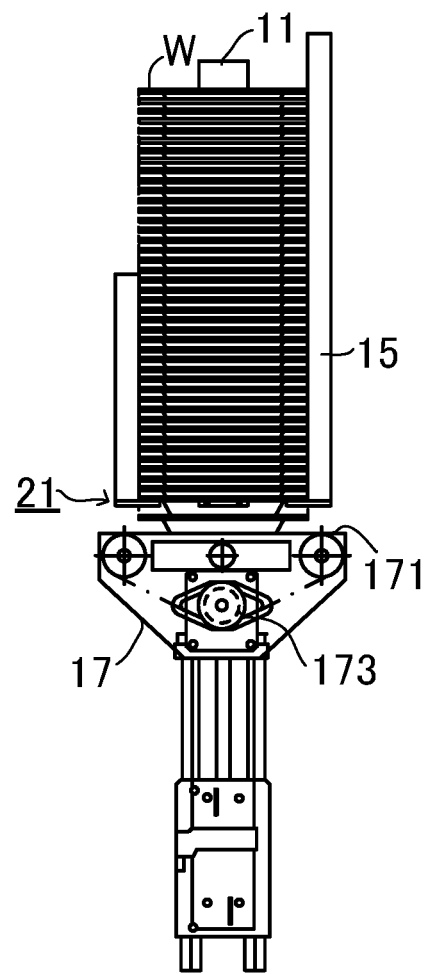
FIG. 3B is an explanatory diagram showing the extraction conveyor 17 at a separation position.
Figure 3C:
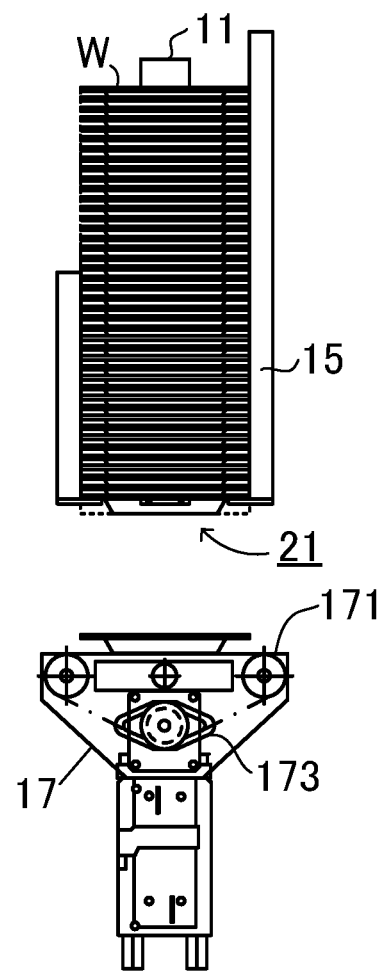
FIG. 3C is an explanatory diagram showing the extraction conveyor 17 at a sending position.

As shown in FIG. 2, the extraction conveyor 17 includes an endless belt 171 and a plurality of guide rollers 173 including a driving roller. The extraction conveyor 17 moves in a reciprocating manner in a perpendicular direction as a whole by a driving device which is a servo motor. The extraction conveyor 17 moves up to a predetermined extraction position of extracting the food container, sucks the lowest food container in the food container group at the extraction position. Then, when the extraction conveyor 17 moves down to a feeding position of feeding the food container from the extraction position, the endless belt 171 is operated to feed the extracted food container to a carrying unit (not shown) which is configured as a conveyor or the like. Desirably, the downward movement speed of the extraction conveyor 17 is controlled in multiple levels. Specifically, when a position in which the extracted food container is separated from the food container group is defined as the separation position, the first downward movement speed from the extraction position to the separation position is set to be slower than the second downward movement speed from the separation position to the feeding position. With this configuration, it is possible to more reliably extract the food container and to supply the container without delaying the downward movement speed more than necessary. In addition, since the separation position is changed in the perpendicular direction depending on the shape of the food container, the extraction conveyor 17 is configured to be switched to an appropriate speed at an appropriate height by the control device 31. FIG. 3A shows the extraction conveyor 17 at the extraction position, FIG. 3B shows the extraction conveyor 17 at the separation position, and FIG. 3C shows the extraction conveyor 17 at the feeding position.

Figure 4:
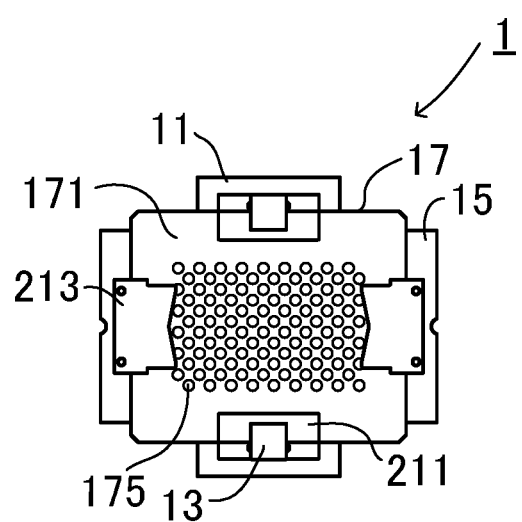
FIG. 4 is a top view showing a configuration of the extraction unit 1.

The ring blower 19 is a suction device which sucks the food container. As shown in FIG. 1, the ring blower 19 is provided in the vicinity of the lower floor of the food container supply device. The ring blower 19 is connected to a suction port 175 having a plurality of holes provided in an upper surface of the extraction conveyor 17 by a pipe including a flexible hose (not shown). As shown in FIG. 4, the suction port 175 which is provided in the extraction conveyor 17 has an area of a size capable of sucking a maximum food container accommodated in a maximum stocker W capable of holding by the stocker holder 11 and is provided in at least four corners and the center of the upper surface of the extraction conveyor 17. Further, desirably the position of the suction port 175 capable of sucking the food container is selectable and the suction port 175 which is more suitable for suction is selected in response to the shape of the food container. For example, it is desirable to perform a sucking operation from the center suction port 175 in a food container having a circular bottom surface and to perform a sucking operation from the suction ports 175 at four corners in a food container having a substantially rectangular bottom surface with a relatively large area. In this way, the food container supply device of the embodiment can appropriately supply more kinds of food containers.

The gripping device 21 includes a pair of claws 211 which are positioned at the front and rear sides in a first horizontal direction (an X-axis direction) and a pair of shutters 213 which are positioned at the front and rear sides in a second horizontal direction (a Y-axis direction) orthogonal to the X-axis direction. The claw 211 is disposed right below the lower end of the stocker holder 11 between the stocker holder 11 and the extraction conveyor 17. Further, the shutter 213 is disposed right below the lower end of the side guide 15 between the side guide 15 and the extraction conveyor 17. The claw 211 and the shutter 213 are respectively positioned under the control of the control device 31. The claw 211 includes a driving device which is an electric cylinder (not shown) controlled by the control device 31 and the shutter 213 includes a driving device which is a servo motor (not shown) controlled by the control device 31. For that reason, since the claw 211 and the shutter 213 of the food container supply device of the embodiment can be positioned to the height corresponding to the type of the food container by the control device 31, there is a merit of selectively supplying more kinds of food containers and reducing a burden on the operator in a setup work before the supply operation.

At least one of the claw 211 and the shutter 213 presses at least one or more food containers positioned above the lowest food container and including the second food container from the lowest position in the food container group accommodated in the stocker W so that the extraction conveyor 17 does not extract the plurality of food containers. In the description below, one or more food containers positioned above the lowest food container and including the second food container from the lowest position will be simply referred to as non-extraction food containers.

In the food container group, the food containers are partially connected to one another. However, the extraction conveyor 17 separates only the lowest food container by sucking the lowest food container from the non-extraction food container gripped by at least one of the claw 211 and the shutter 213. For that reason, it is possible to reliably extract the food containers one by one.

Figure 5A:
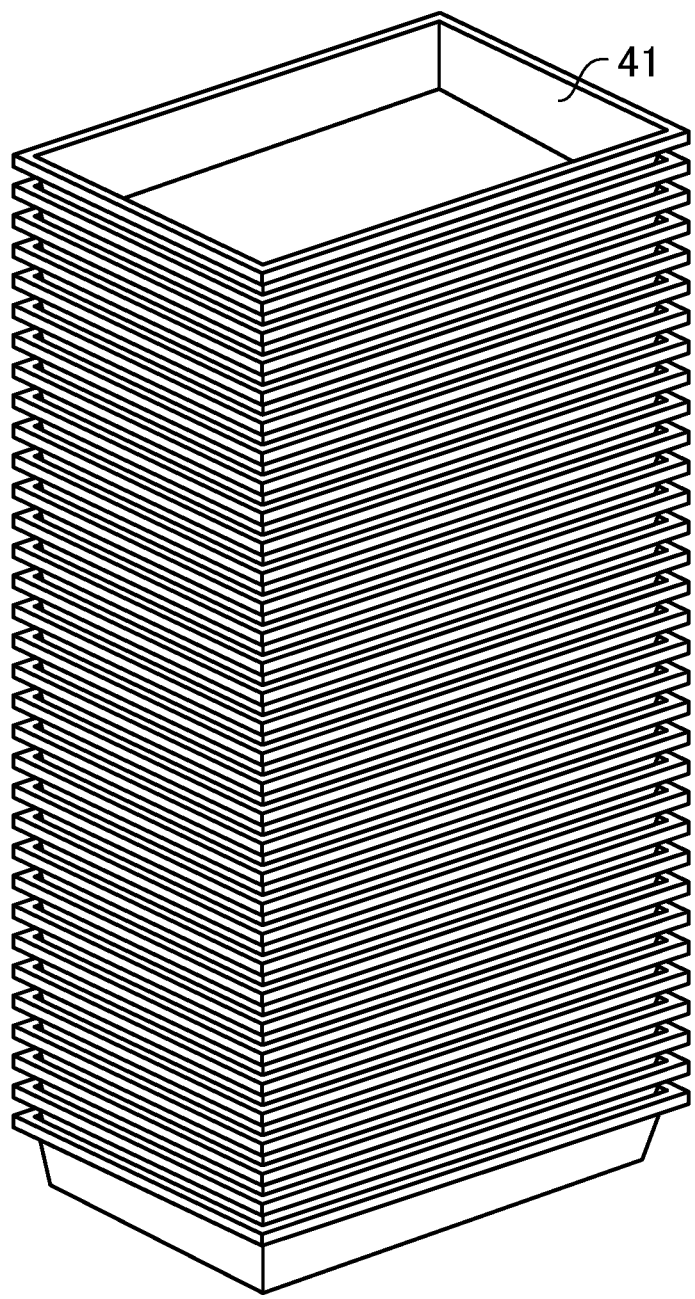
FIG. 5A is a perspective view showing a food container group 41 of which a gripped part has a linear shape in a top view.
Figure 5B:
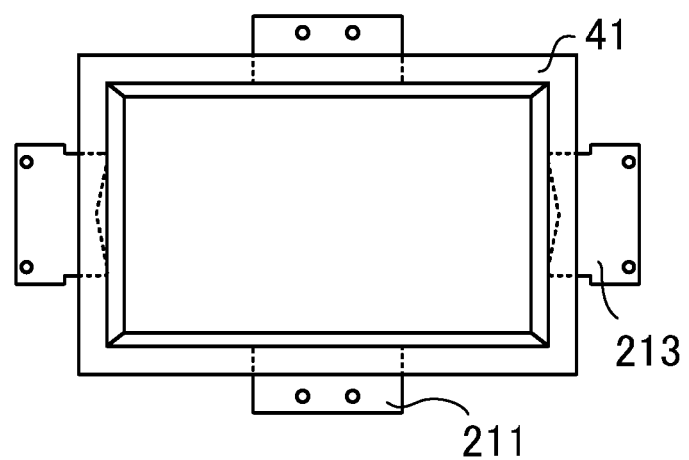
FIG. 5B is a top view showing a gripping device 21 of which a claw 211 and a shutter 213 grip a non-extraction food container of the food container group 41.
Figure 6A:
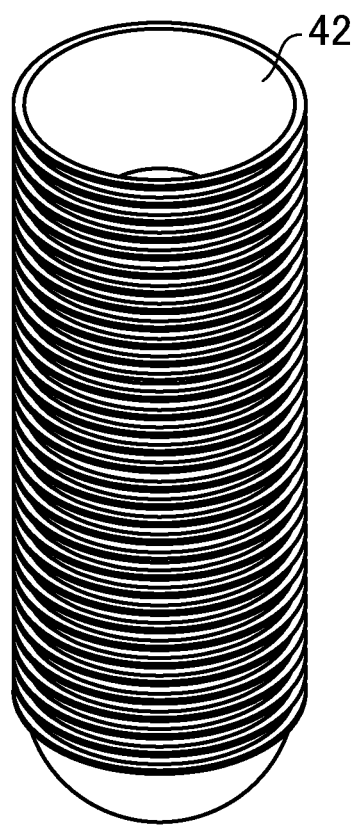
FIG. 6A is a perspective view showing a food container group 42 of which a gripped part has a curved shape in a horizontal direction.
Figure 6B:
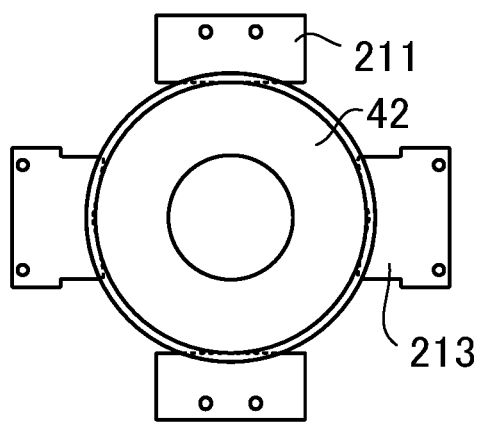
FIG. 6B is a top view showing the gripping device 21 of which the claw 211 and the shutter 213 grip a non-extraction food container of the food container group 42.

As shown in FIG. 4, the front end of the claw 211 has a linear shape extending in the Y-axis direction and the front end of the shutter 213 has a shape in which the center is more recessed than both ends. For that reason, in the food container of which the gripped part has a linear shape in the top view as in the food container group 41 shown in FIG. 5A, the claw 211 can more appropriately grip the non-extraction food container as shown in FIG. 5B. Similarly to the food container group 42 shown in FIG. 6A, in the food container of which the gripped part has a curved shape in the top view, in other words, the gripped part has a curved shape in a horizontal direction, the shutter 213 can more appropriately grip the non-extraction food container as shown in FIG. 6B.

The control device 31 of the control unit 3 controls at least the driving device (not shown) of the gripping device 21. The control device 31 controls the positioning of the gripping device 21 basically based on numerical position information which is input from the operation panel 33 by the operator or stored in the storage device. Further, the control device 31 selectively performs one of gripping operation patterns including an operation of respectively moving the claw 211 to the first forward movement position and moving the shutter 213 to the second forward movement position at the same time, an operation of moving one of the claw 211 and the shutter 213 to the first forward movement position or the second forward movement position and then moving the other thereof to the first forward movement position or the second forward movement position, and an operation of moving only one of the claw 211 and the shutter 213 to the first forward movement position or the second forward movement position, in response to the shape of the food container. In addition, positions in which each of the claw 211 and the shutter 213 contacts the food container will be referred to as the first forward movement position and the second forward movement position, respectively. Positions in which each of the claw 211 and the shutter 213 does not contact the food container will be referred to as a first backward movement position and the second backward movement position, respectively.

Normally, the claw 211 and the shutter 213 are respectively moved to the first forward movement position and the second forward movement position at the same time. First, the extraction conveyor 17 is moved upward to the extraction position. Next, as shown in FIGS. 5A, 5B, 6A and 6B, the non-extraction food container is gripped while the claw 211 and the shutter 213 are inserted between the lowest food container and the non-extraction food container at the same time. In this state, the extraction conveyor 17 moves down to the feeding position while sucking the lowest food container and feeds the lowest food container.

Figure 7A:
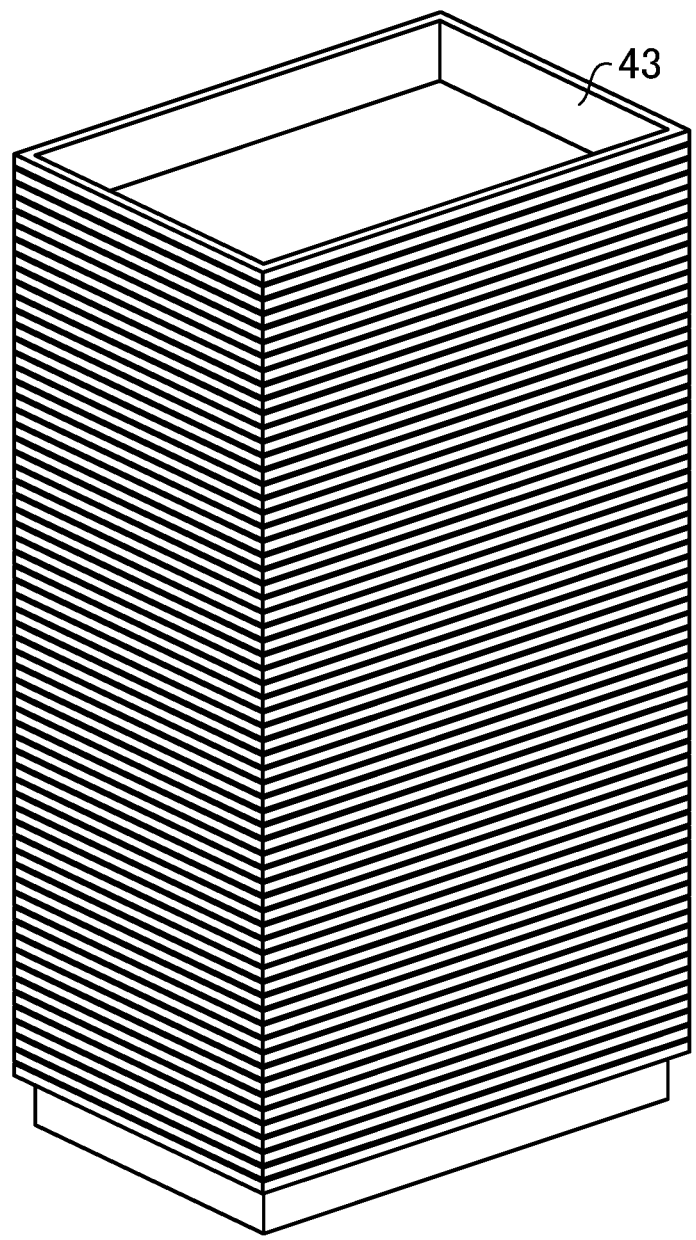
FIG. 7A is a perspective view showing a food container group 43 in which a gap between the lowest food container and the non-extraction food container is small.
Figure 7B:
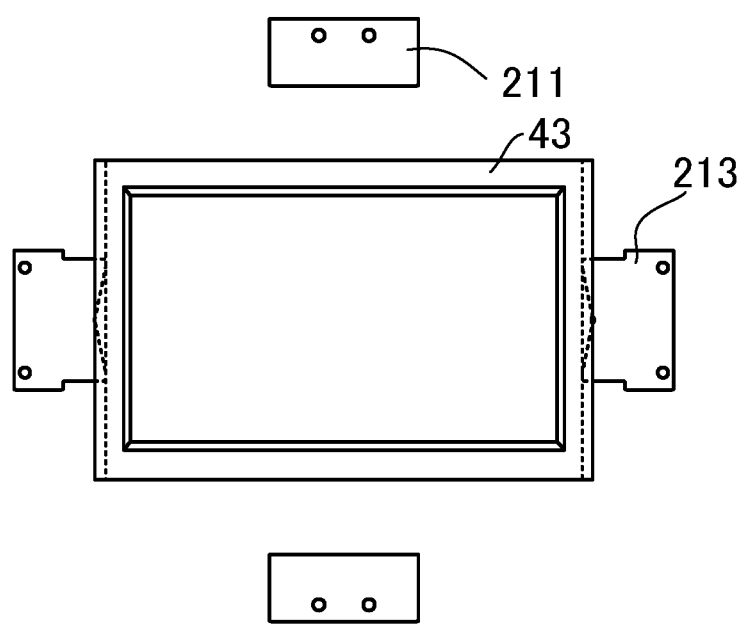
FIG. 7B is a top view showing the gripping device 21 of which the shutter 213 presses the lowest food container of the food container group 43.
Figure 7C:
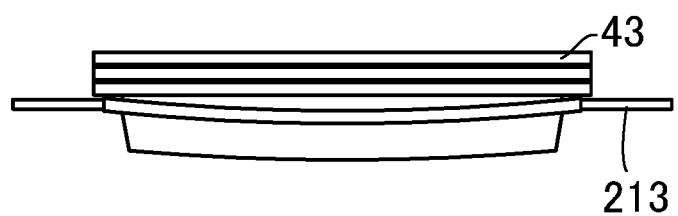
FIG. 7C is a front view showing the gripping device 21 of which the shutter 213 presses the lowest food container of the food container group 43.
Figure 7D:
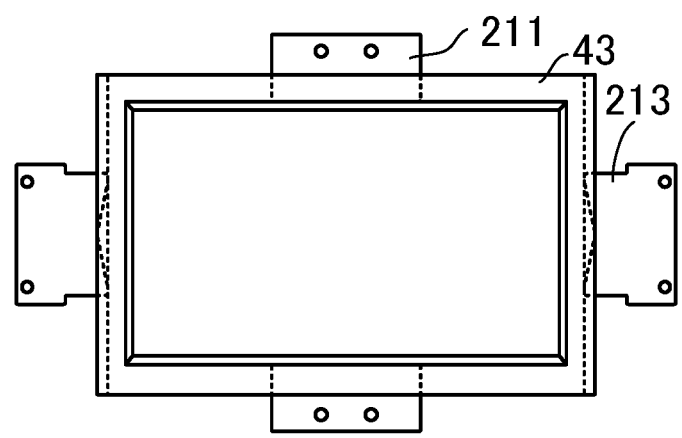
FIG. 7D is a top view showing the gripping device 21 of which only the claw 211 grips the non-extraction food container of the food container group 43.

Further, one of the claw 211 and the shutter 213 may be moved to the first forward movement position or the second forward movement position and then the other thereof may be moved to the first forward movement position or the second forward movement position. When a gap between the lowest food container and the non-extraction food container is small particularly as in the food container group 43 shown in FIG. 7A, it is desirable to employ a configuration in which to one of the claw 211 and the shutter 213 is moved to the first forward movement position or the second forward movement position to press the lowest food container and then the other thereof is moved to the first forward movement position or the second forward movement position to grip the non-extraction food container. First, the extraction conveyor 17 is moved up to the extraction position. Next, as shown in FIGS. 7B and 7C, the lowest food container is pressed by the shutter 213 to widen a gap with respect to the non-extraction food container. Then, as shown in FIG. 7D, the claw 211 is inserted into the widened gap to grip the non-extraction food container. In this state, the extraction conveyor 17 moves down to the feeding position while sucking the lowest food container and feeds the lowest food container. Instead of this constitution, the lowest food container may be pressed by the claw 211 and the shutter 213 may be inserted into the widened gap to grip the non-extraction food container.

Figure 8A:
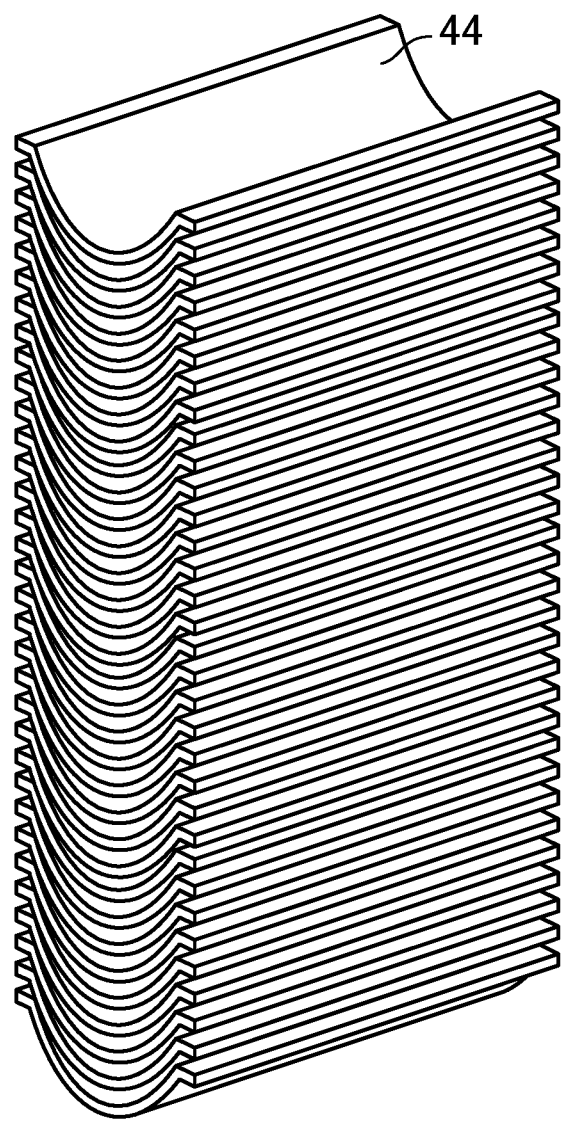
FIG. 8A is a perspective view showing a food container group 44 of which a gripped part has a curved shape in a vertical direction.
Figure 8B:
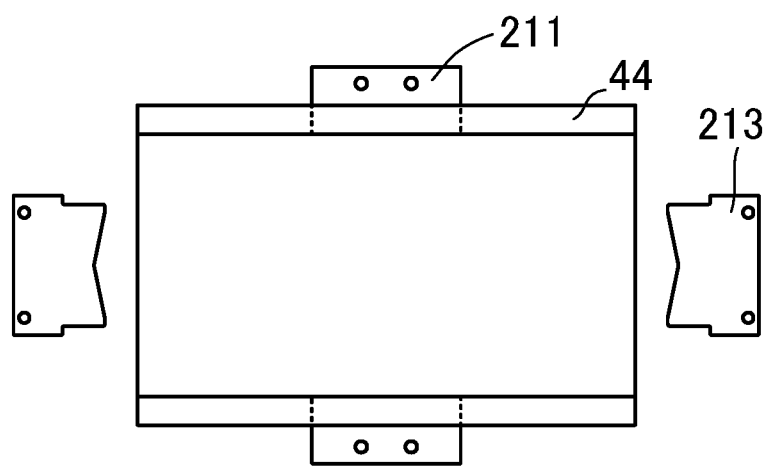
FIG. 8B is a top view showing the gripping device 21 of which only the claw 211 grips a non-extraction food container of the food container group 44.

Further, there is a case in which only one of the claw 211 and the shutter 213 can be inserted into the gap between the lowest food container and the non-extraction food container such as in the food container group 44 of which the gripped part has a curved shape in a vertical direction. In this situation, only one of the claw 211 and the shutter 213, which can be inserted into the gap is operated as shown in FIG. 8B. Even in this case, the operation of the extraction conveyor 17 is the same.

In this way, it is possible to supply various food containers without replacing the components by changing the gripping operation patterns of the claw 211 and the shutter 213 in response to the shape of the food container.

The control device 31 of the food container supply device of the embodiment sequentially operates at least the pusher 13, the side guide 15, the extraction conveyor 17, and the gripping device 21 according to a predetermined program. Since the control device 31 can control the positioning of the devices by controlling a driving device such as a servo motor or an electric cylinder, the food container supply device of the embodiment can perform a setup work in response to the type of the food container to be supplied by the operation from the operation panel 33 or the automatic operation. Accordingly, the burden on the operator is more reduced. In addition, the servo motor or the electric cylinder has been exemplified as the driving device of each of devices, but the invention is not limited thereto.

Further, the control device 31 of the food container supply device of the embodiment can perform a teaching operation. For example, the stocker W and the food container are set in the food container supply device tentatively. Then, the devices are sequentially operated in a manual mode by the operation of the control device 31 to acquire the position information. The position information is stored and registered in the storage device. Therefore, the operator does not need to input a numerical value required in response to the type of the food container.

The food container supply device of the invention does not need to have the same configuration as that of the food container supply device specifically described in the embodiment. Although several examples are shown, various modifications can be made without departing from the technical spirit of the invention and various applications can be also used.

What is claimed is:

1. A food container supply device comprising:
    a stocker which accommodates a food container group in a stacked state;
    a stocker holder which holds the stocker;
    an extraction conveyor which moves in a reciprocating manner in a perpendicular direction between an extraction position of extracting a lowest food container in the food container group and a feeding position of feeding the lowest food container, and includes a suction port of sucking the lowest food container;
    a gripping device which is disposed between the stocker holder and the extraction conveyor, moves up and down to control a positioning, and presses at least a second food container from the lowest food container in the food container group; and
    a control device which controls positioning of at least the gripping device,
    wherein the gripping device includes a pair of claws which move in a first horizontal direction between a first forward movement position of contacting the food container and a first backward movement position of non-contacting the food container, and a pair of shutters which moves in a second horizontal direction orthogonal to the first horizontal direction between a second forward movement position of contacting the food container and a second backward movement position of non-contacting the food container,
    wherein the control device selectively positions the pair of claws and the pair of shutters at a height of the stacked food container group such that the height corresponds to the type of a lowermost container to be fed, and
    wherein the control device selectively controls a gripping operation and at least one of the pair of claws and the pair of shutters based on a shape of the food container group to be one of a gripping operation pattern of respectively moving the pair of claws to the first forward movement position and moving the pair of shutters to the second forward movement position at the same time, a gripping operation pattern of moving one of the pair of claws and the pair of shutters to the first forward movement position or the second forward movement position and then moving the other to the first forward movement position or the second forward movement position in response to widen a gap with respect to a non-extraction container, and a gripping operation pattern of moving only one of the pair of claws and the pair of shutters to the first forward movement position or the second forward movement position, during each operation of extracting the food container in response to a shape of the food container.

2. The food container supply device according to claim 1, wherein the control device selects a gripping operation pattern of moving one of the pair of claws and the pair of shutters to the first forward movement position or the second forward movement position to press the lowest food container and then moving the other to the first forward movement position or the second movement position to grip the second food container from the lowest food container.

3. The food container supply device according to claim 1, wherein the pair of claws has a linear shape in which a front end extends in the second horizontal direction, and
wherein the pair of shutters has a shape in which a center of a front end is more recessed than two sides of the front end.

4. The food container supply device according to claim 1, wherein the extraction conveyor is set such that a first downward movement speed from the extraction position to a separation position in which the food container is separated from the food container group is slower than a second downward movement speed from the separation position to the feeding position.

5. The food container supply device according to claim 1, wherein the suction ports are provided in at least four corners and a center of an upper surface of the extraction conveyor and the suction ports are configured in a manner that a position of the suction port for sucking the food container is selectable.

* * * * *